(12) United States Patent
Khan et al.

(10) Patent No.: US 10,104,592 B2
(45) Date of Patent: Oct. 16, 2018

(54) INTERFERENCE MANAGEMENT IN WIRELESS HETEROGENEOUS NETWORKS

(75) Inventors: Asif A. Khan, Stockholm (SE); Konstantinos Dimou, San Francisco, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 458 days.

(21) Appl. No.: 14/370,538

(22) PCT Filed: Jan. 5, 2012

(86) PCT No.: PCT/IB2012/000014
§ 371 (c)(1),
(2), (4) Date: Jul. 3, 2014

(87) PCT Pub. No.: WO2013/102776
PCT Pub. Date: Jul. 11, 2013

(65) Prior Publication Data
US 2015/0004986 A1 Jan. 1, 2015

(51) Int. Cl.
*H04W 36/30* (2009.01)
*H04W 48/02* (2009.01)
(Continued)

(52) U.S. Cl.
CPC ........... *H04W 36/30* (2013.01); *H04W 48/02* (2013.01); *H04W 8/186* (2013.01); *H04W 36/08* (2013.01);
(Continued)

(58) Field of Classification Search
CPC ... H04W 36/30; H04W 48/02; H04W 84/045; H04W 8/186; H04W 36/08; H04W 36/20
See application file for complete search history.

(56) References Cited

U.S. PATENT DOCUMENTS

2009/0245195 A1* 10/2009 Bhattad ................. H04L 5/0053
370/329
2010/0015921 A1* 1/2010 Yavuz ................. H04W 72/085
455/63.1
(Continued)

FOREIGN PATENT DOCUMENTS

| WO | WO 2010093198 A2 * | 8/2010 | ............ H04W 48/06 |
|---|---|---|---|
| WO | 2011085204 A1 | 7/2011 | |
| WO | 2013102776 A1 | 7/2013 | |

OTHER PUBLICATIONS

Author Unknown, "3rd Generation Partnership Project; Technical Specification Group Radio Access Network; Evolved Universal Terrestrial Radio Access (E-UTRA); Radio Resource Control (RRC); Protocol specification (Release 10)," Technical Specification 36.331, Version 10.2.0, Jun. 2011, 3GPP Organizational Partners, 294 pages.
(Continued)

*Primary Examiner* — Kamran Afshar
*Assistant Examiner* — Minjung Kim
(74) *Attorney, Agent, or Firm* — Sage Patent Group (57) ABSTRACT

Mechanisms for managing interference in heterogeneous networks are disclosed. A macro node triggers a handover of a user equipment (UE) being serviced by the macro node to a low power node (LPN) operating in a closed access operating mode wherein the LPN provides service to member UEs. The UE is a non-member of the LPN. The macro node determines a trigger condition, and based on the trigger condition signals the LPN to provide service to the UE. The macro node also directs the UE to execute the handover to the LPN.

22 Claims, 8 Drawing Sheets

(51) Int. Cl.
    *H04W 8/18* (2009.01)
    *H04W 36/08* (2009.01)
    *H04W 36/20* (2009.01)
    *H04W 84/04* (2009.01)

(52) U.S. Cl.
    CPC .......... *H04W 36/20* (2013.01); *H04W 84/045* (2013.01); *Y02D 70/00* (2018.01); *Y02D 70/1262* (2018.01); *Y02D 70/1264* (2018.01)

(56) References Cited

U.S. PATENT DOCUMENTS

| | | | |
|---|---|---|---|
| 2010/0093358 A1* | 4/2010 | Cheong | H04W 36/0055 455/444 |
| 2010/0297997 A1 | 11/2010 | Yavuz et al. | |
| 2010/0309876 A1 | 12/2010 | Khandekar et al. | |
| 2011/0038330 A1 | 2/2011 | Luo et al. | |
| 2011/0051684 A1* | 3/2011 | Li | H04W 36/20 370/331 |
| 2011/0116480 A1* | 5/2011 | Li | H04W 28/04 370/332 |
| 2012/0028645 A1* | 2/2012 | Kim | H04W 48/06 455/444 |
| 2013/0044697 A1* | 2/2013 | Yoo | H04W 72/082 370/329 |

OTHER PUBLICATIONS

Author Unknown, "3rd Generation Partnership Project; Technical Specification Group Radio Access Network; Evolved Universal Terrestrial Radio Access Network (E-UTRAN); X2 application protocol (X2AP) (Release 10)," Technical Specification 36.423, Version 10.4.0, Dec. 2011, 3GPP Organizational Partners, 132 pages.

Author Unknown, "3rd Generation Partnership Project; Technical Specification Group Radio Access Network; Evolved Universal Terrestrial Radio Access (E-UTRA); Further advancements for E-UTRA physical layer aspects (Release 9)," Technical Specification 36.814, Version 9.0.0, Mar. 2010, 3GPP Organizational Partners, 104 pages.

Author Unknown, "LTE Advanced: Heterogeneous Networks," Feb. 2010, Qualcomm Incorporated, 12 pages.

Author Unknown, "The LTE Network Architecture—A Comprehensive Tutorial," Strategic White Paper, 2009, Alcatel-Lucent, 26 pages.

Bruck, Stefan, "Backhaul Requirements for Centralized and Distributed Cooperation Techniques," Jul. 8, 2010, Qualcomm CDMA Technologies, 14 page.

Henao, Jonathan C. et al, "Advanced Receiver Signal Processing Techniques: Evaluation and Characterization," Advanced Radio Interface Technologies for 4G Systems (ARTIST4G), Jan. 21, 2011, https://ict-artist4g.eu/projet/work-packages/wp2/deliverables/d2.2/final/d2.2-1.

Zyren, Jim, "Overview of the 3GPP Long Term Evolution Physical Layer," White Paper, Jul. 2007, Freescale Semiconductor, Inc., 27 pages.

International Search Report and Written Opinion for PCT/IB2012/000014, dated Oct. 29, 2012, 11 pages.

International Preliminary Report on Patentability for PCT/IB2012/000014, dated Jul. 17, 2014, 8 pages.

Schoneich, Hendrik, "CRS Interference Cancellation in Systems with Time-Domain Resource Partitioning," presented at the Future Network 6th FP7 Concertation Workshop, Oct. 18, 2010, Brussels, Belgium, Qualcomm, 13 pages.

\* cited by examiner

INTERFERENCE MANAGEMENT IN WIRELESS HETEROGENEOUS NETWORKS

This application is a 35 U.S.C. § 371 national phase filing of International Application No. PCT/IB2012/000014, filed Jan. 5, 2012, the disclosure of which is incorporated herein by reference in its entirety.

FIELD OF THE DISCLOSURE

The subject disclosure relates to interference management, and in particular to interference management in wireless heterogeneous networks.

BACKGROUND

Modern cellular networks increasingly implement communication services to user equipment (UEs) through access nodes that have overlapping cell coverage areas, such as via a macro node (e.g., macro base station) that provides service to a relatively large cell coverage area, and one or more low power nodes (LPNs) (e.g., femto cells and pico cells) each of which provides service to a relatively small cell coverage area. The cell coverage area of the macro node may substantially overlap the cell coverage areas of one or more of the LPNs, and may even completely encompass the cell coverage areas of the one or more LPNs. The use of LPNs allows a service provider to ensure a good signal or relatively high bandwidth to a UE under circumstances where it would be difficult, impossible, or impractically expensive to do so with only relatively high-power macro nodes. This type of cellular network may be referred to as a heterogeneous network (HetNet).

LPNs may operate in different modes. Open access operating mode (OAOM) LPNs accept a handover from any subscriber UE. Hybrid access operating mode (HAOM) LPNs typically provide access to only UEs that are registered as members of the LPN, but will also provide access to non-member UEs based on certain criteria. A closed access operating mode (CAOM) LPN provides access only to UEs that are registered as members of the CAOM LPN. A Closed Subscriber Group (CSG) Long Term Evolution (LTE) LPN is an example of such a CAOM LPN.

While, as discussed above, the use of LPNs offer advantages, it has been determined that a CAOM LPN can cause interference with a UE that is proximate to the CAOM LPN but is not a member of the CAOM LPN and is therefore being served by a macro node. In particular, a major source of interference from such CAOM LPNs in an LTE HetNet is the CAOM LPNs transmission of cell-specific reference signals (CRS). Such interference can reduce the quality of the link between the UE and the macro node, and result in service outages, degraded communication links, and the like.

Some newer UEs include interference cancellation capabilities that help mitigate interference caused by the transmission of CRS. However, such interference cancellation capabilities are relatively complex, increasing the cost of the UE, and the mechanisms involved take away part of the useful signal, resulting in a lower Signal to Interference-plus-Noise Ratio (SINR) of the link between the UE and the macro node serving the UE. Moreover, legacy UEs do not have such interference cancellation capabilities. Accordingly, there is a need for additional mechanisms for facilitating communication between UEs and CAOM LPNs under certain circumstances.

SUMMARY

The present disclosure relates to mechanisms for managing interference in wireless heterogeneous networks. In one embodiment, a macro node triggers a handover of a user equipment (UE) being served by the macro node to a closed access operating mode (CAOM) low power node (LPN) that provides service to member UEs, and the UE is a non-member of the CAOM LPN. In particular, the macro node determines a trigger condition, and based on the trigger condition, signals the CAOM LPN to provide service to the UE. The macro node also directs the UE to execute a handover to the CAOM LPN.

The trigger condition may comprise one or more different criteria. In one embodiment, the trigger condition comprises determining that an unacceptable level of interference is caused by the CAOM LPN, and determining that the UE is not interference cancellation capable. An unacceptable level of interference may be determined, for example, by determining that a link quality indicator that indicates a link quality of the link between the macro node and the UE indicates an unacceptable level of interference. The link quality indicator may comprise, for example, a Signal to Interference-plus-Noise Ratio (SINR) of the link between the macro node and the UE, and an unacceptable level of interference may comprise the SINR being less than a threshold SINR.

The macro node may determine that the unacceptable level of interference is caused by the CAOM LPN. In one embodiment, the macro node may receive from the UE a first reference symbol received power (RSRP) value associated with each neighbor access node operating in a mode other than the CAOM from which the UE receives a reference symbol with sufficient signal strength. If the RSRP values are below a first threshold, the macro node may direct the UE to report a second RSRP value associated with each CAOM access node from which the UE receives a reference symbol with sufficient signal strength. The macro node receives the second RSRP value associated with the CAOM LPN, and determines that the second RSRP value is above the threshold. From this information, the macro node may deduce that the CAOM LPN is the source of the unacceptable level of interference.

The macro node may signal the CAOM LPN to provide service to the UE for only a temporary duration of time, based, for example, on an amount of time the UE is expected to spend in proximity to the CAOM LPN (i.e., a sojourn time), or until the UE leaves the coverage area of the CAOM LPN.

In one embodiment the macro node may indicate to the CAOM LPN that the UE is not interference cancellation capable. The CAOM LPN, in response, may then permit the UE to execute a handover from the macro node to the CAOM LPN.

The macro node may comprise an access node, such as a base station which is implemented by a service provider, that provides service to UEs over a relatively large area, and has a transmit power above about 5 watts, and may have a transmit power of about 40 watts. The CAOM LPN comprises a low power node such as a femto cell that provides service to UEs over a relatively small area, such as a home or business, and has a transmit power below about 3 watts. The wireless coverage area of the CAOM LPN may be completely subsumed within the wireless coverage area of the macro node.

In another embodiment, a CAOM LPN receives a signal from a macro node to provide access to a UE. In response to the signal, the CAOM LPN changes an operating mode from the CAOM to a hybrid access operating mode wherein the LPN provides access to the member UEs and the UE. The LPN then provides service to the UE.

In yet another embodiment, a UE provides link quality data to a macro node to facilitate determining a link quality of a link between the UE and the macro node. The UE also provides signal strength data to the macro node that identifies a signal strength between the UE and a CAOM LPN. The UE is a non-member of the CAOM LPN. The UE receives a direction from the macro node to execute a handover to the CAOM LPN, and in response, the UE executes the handover to the CAOM LPN.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
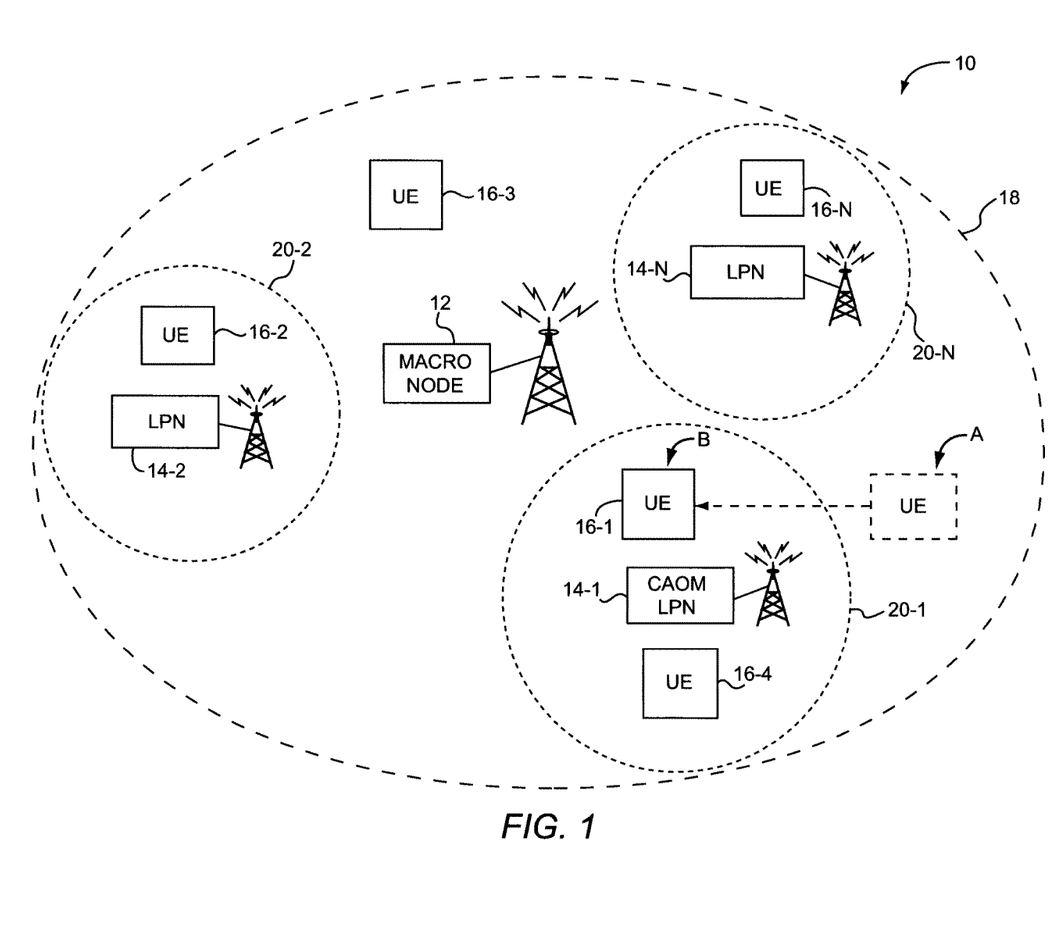
FIG. 1 is a diagram of an exemplary system in which embodiments of the present disclosure may be practiced.

The present disclosure relates to mechanisms for managing interference in wireless heterogeneous networks. FIG. 1 is a diagram of an exemplary heterogeneous network (HetNet) 10 in which embodiments of the present disclosure may be practiced. The HetNet 10 includes a macro node 12 and one or more low power nodes (LPNs) 14-1-14-N (generally, LPNs 14). The macro node 12 is an access node that represents one or more components suitable for, among other features, communicating wirelessly via cellular communications with one or more user equipment (UEs) 16-1-16-N (generally, UEs 16) within a macro wireless coverage area 18 (sometimes referred to as a cell). The macro node 12 may comprise any suitable cellular base station. In the context of a 3rd Generation Partnership Project (3GPP) Long Term Evolution Advanced (LTE-A) HetNet 10, the macro node 12 may be referred to as an eNodeB. The macro node 12 typically has a transmit power greater than about 5 watts, and may have a transmit power of about 40 watts, and is typically one of many macro nodes 12 deployed by, for example, a service provider that provides cellular service to subscribers. Thus, while for purposes of illustration only a single macro node 12 is depicted in the HetNet 10, the macro node 12 may work in conjunction with neighboring macro nodes 12 to accept handovers from UEs 16 as such UEs 16 depart the macro wireless coverage area of another macro node 12 and enter the macro wireless coverage area 18.

The UEs 16 comprise any mobile computing device capable of establishing a link with the macro node 12, and may comprise, for example, a cellular telephone such as an Apple® iPhone® smartphone, an Android®-based smartphone, or the like; a computing tablet with cellular capabilities such as an Apple iPad® or the like; a laptop computer with cellular capabilities; or any other processing device capable of communicating wirelessly with the macro node 12.

The LPNs 14 are relatively low power base stations (e.g., access nodes) which may be deployed by the service provider for a variety of reasons, including, for example, to compensate for areas within the macro wireless coverage area 18 in which the macro node 12 cannot establish a strong signal, or to provide additional bandwidth to an entity within a coverage area of a LPN 14, such as a business or a home, or the like. The LPNs 14 typically have a transmit power less than about 3 watts and thus have a smaller corresponding LPN wireless coverage area 20-1-20-N (generally the LPN wireless coverage area 20) than the macro wireless coverage area 18. Each LPN wireless coverage area 20 may overlap with the macro wireless coverage area 18, and indeed may be completely subsumed within the macro wireless coverage area 18, as depicted in FIG. 1. The LPNs 14 may comprise, for example, a microcell, femtocell, picocell, or the like. In the context of a 3GPP LTE-A HetNet 10, one or more of the LPNs 14 may be referred to as Home eNodeBs (HeNBs). The LPNs 14 may communicate with the macro node 12 using any desired interface, such as, for example, the X2 interface.

A LPN 14 may operate in any of several different operating modes. One operating mode may be referred to as an open access operating mode (OAOM) wherein the LPN 14 may serve any UE 16 within the corresponding LPN wireless coverage area 20. Another operating mode is referred to as closed access operating mode (CAOM), wherein the LPN 14 serves only UEs 16 that are members of the LPN 14. In FIG. 1, the CAOM LPN 14-1 is an LPN operating in CAOM, and the LPNs 14-2-14N are LPNs operating in modes other than CAOM. UE membership in the CAOM LPN 14-1 may be implemented, for example, via an access control list, such as a closed subscriber group (CSG) list that identifies each member UE 16 that is a member of the CAOM LPN 14-1. In the context of a 3GPP LTE-A HetNet 10, the CAOM LPN 14-1 may be referred to as a CSG LPN. A third operating mode is a hybrid access operating mode (HAOM), wherein the LPN provides service to UEs 16 which are identified in an access control list associated with the LPN, as well as UEs 16 which are not identified in the access control list under certain conditions.

A HetNet 10 such as that depicted in FIG. 1 which comprises a combination of both a macro node 12 and one or more LPNs 14 that operate at least in part within the macro wireless coverage area 18 of the macro node 12 offer several advantages in terms of system capacity and performance. For example, a service provider may install the LPN 14-2 at a particular location to offload traffic from the macro node 12 to the LPN 14-2 because the LPN wireless coverage area 20-2 is a substantially high data usage area. As another example, the location of an individual's home may result in poor signal strength with the macro node 12. Accordingly, the service provider may facilitate the installation of the CAOM LPN 14-1 in the individual's home to ensure a strong signal in and about the individual's home.

It has been determined that CAOM LPNs such as the CAOM LPN 14-1 cause interference with UEs 16 which are in proximity to the CAOM LPN but which are not members of the CAOM LPN. A UE 16 that is not a member of a CAOM LPN may be referred to herein as a "non-member" UE 16. In particular, the presence of one or more CAOM LPNs that operate in proximity to UEs 16 which are not members of such CAOM LPNs can result in low Signal to Interference-plus-Noise Ratios (SINR) for such UEs 16, lower throughput, and reduced system capacity. In the context of a 3GPP LTE-A HetNet 10, studies have shown that a primary source of such interference is the Cell-Specific Reference Symbols (CRS) transmitted by CSG LPNs on the downlink (DL).

To combat such interference, some UEs 16 are interference cancellation (IC) capable, and include IC mechanisms, such as CRS-IC, which helps such UEs 16 minimize such interference. However, such IC mechanisms are relatively complex, and thus raise the costs of such UEs 16. Moreover, these IC mechanisms are relatively new, and consequently there are substantial legacy UEs 16 that are not IC capable. Furthermore, even for IC-capable UEs 16, interference cancellation reduces part of the useful signal, resulting in lower SINR.

A UE 16 which is a member of the CAOM LPN 14-1 may be referred to herein as a "member UE 16." Assume that the UE 16-1 is at location A at a first point in time, and is not a member of the CAOM LPN 14-1 (e.g., the UE 16-1 is not identified in the access control list associated with the CAOM LPN 14-1). Although the UE 16-1 while at location A may receive CRS from the LPNs 14-1, 14-2 (as well as from 14-N possibly), the UE 16-1 may be at a sufficient distance from the LPNs 14 such that the CRS do not substantially interfere with the link established between the macro node 12 and the UE 16-1. Thus, while at location A, the link quality of the link between the macro node 12 and the UE 16-1 is good, and the SINR of such link is relatively high. As the UE 16-1 moves from location A to location B, and consequently comes within proximity to the CAOM LPN 14-1, the signal strength of the CAOM LPN 14-1 becomes stronger, resulting in a lower SINR in the link between the UE 16-1 and the macro node 12. If the CAOM LPN 14-1 was instead a LPN operating in the OAOM or the HAOM, the UE 16-1 may be able to execute a handover from the macro node 12 to the CAOM LPN 14-1 and thereby eliminate the interference. However, because the CAOM LPN 14-1 operates in CAOM and the UE 16-1 is not a member of the CAOM LPN 14-1, the UE 16-1 simply experiences poor signal quality with the macro node 12.

Figure 2:
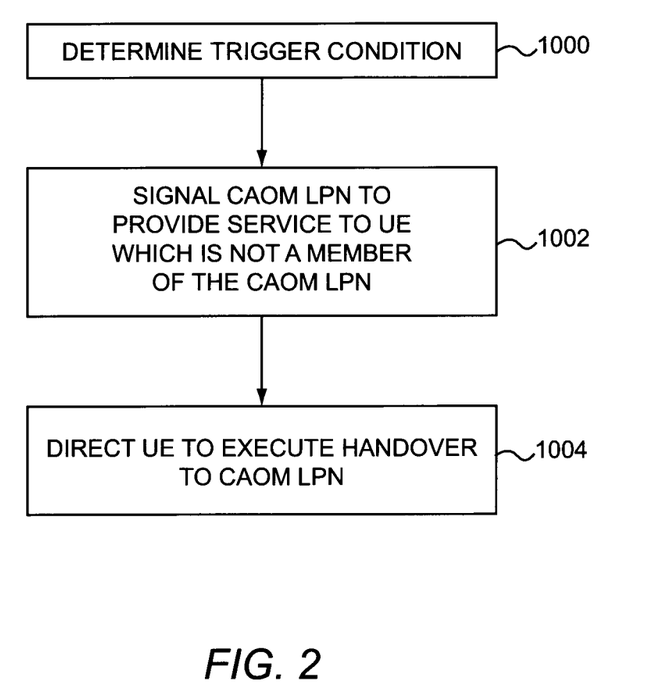
FIG. 2 is a flowchart of an exemplary method of triggering a handover by a macro node according to one embodiment.

In one embodiment of the present disclosure, the HetNet 10 eliminates or greatly reduces such interference by triggering a temporary handover of the UE 16-1 to the CAOM LPN 14-1, even though the UE 16-1 is not a member of the CAOM LPN 14-1. FIG. 2 is a flowchart of an exemplary method of triggering a handover of the UE 16 from the macro node 12 to the CAOM LPN 14-1 according to one embodiment, and will be discussed in conjunction with FIG. 1. Assume, as discussed above, that the UE 16-1 moves from the location A to the location B. The macro node 12 determines a trigger condition (FIG. 2, block 1000). As discussed in greater detail herein, the trigger condition can comprise one or more conditions and/or criteria. In response to determining the trigger condition, the macro node 12 signals the CAOM LPN 14-1 to provide service to the UE 16-1, which is not a member of the CAOM LPN 14-1 (FIG. 2, block 1002). The signal may comprise any suitable message or messages communicated from the macro node 12 to the CAOM LPN 14-1. Such message or messages may be communicated using any desired protocol and interface, including, for example, the X2 interface. The macro node 12 also directs the UE 16-1 to execute a handover from the macro node 12 to the CAOM LPN 14-1 (FIG. 2, block 1004). The UE 16-1 executes the handover and is subsequently temporarily served by the CAOM LPN 14-1 rather than the macro node 12, eliminating the interference problem.

Figure 3:
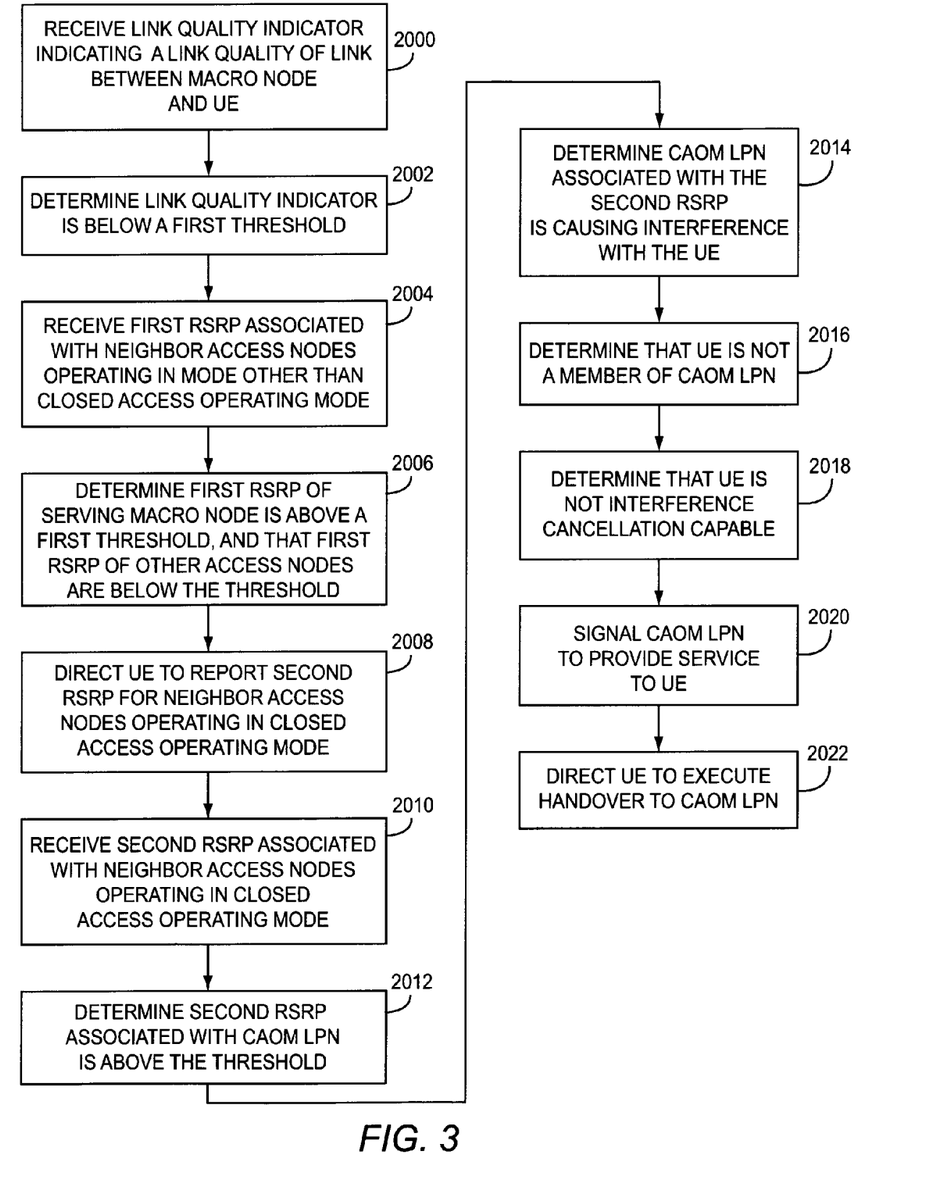
FIG. 3 is a flowchart of an exemplary method of triggering a handover by a macro node according to another embodiment.

FIG. 3 is a flowchart of another exemplary method of triggering a handover by the macro node 12 to the CAOM LPN 14-1. In this embodiment, the trigger condition includes determining that there is unacceptable level of interference in the link between the macro node 12 and the UE 16-1. In particular, the macro node 12 may receive from the UE 16-1 a link quality indicator that indicates the link quality of the link between the macro node 12 and the UE 16-1 (FIG. 3, block 2000). The link quality indicator may comprise any suitable quantifier used to determine a quality of a wireless communications link. In one embodiment, the link quality indicator comprises the SINR of the link. The macro node 12 may then determine that the link quality indicator is below a first threshold (FIG. 3, block 2002). For example, the first threshold may be a threshold SINR which demarcates an acceptable level of interference from an unacceptable level of interference. This determination may be sufficient to constitute the trigger condition. In other embodiments, additional determinations may be made before the handover is triggered.

In one embodiment, the macro node 12 determines that the unacceptable level of interference is caused by a CAOM LPN, such as the CAOM LPN 14-1. One mechanism for making such a determination is based on signal strength information associated with signals that the UE 16-1 receives from neighboring access nodes that are not operating in CAOM (e.g., the LPNs 14-2-14-N, the macro node 12, and potentially other macro nodes 12). The signal strength information can comprise any suitable information for identifying the strength of a signal between the UE 16-1 and an access node. In one embodiment, the signal strength information comprises a reference symbol received power (RSRP) associated with the reception by the UE 16-1 of a reference symbol from the corresponding access node. Accordingly, the macro node 12 receives from the UE 16-1 first RSRPs associated with each neighbor access node operating in a mode other than the CAOM and for which the UE 16-1 receives a sufficiently strong signal (FIG. 3, block 2004). The use herein of ordinal terms such as "first" and "second" is simply to distinguish between different elements, information, or the like, and does not imply a priority, order, or importance between such elements, information, or the like. The first RSRPs received from the UE 16-1 may also include an RSRP that indicates the strength of the signal between the serving macro node 12 and the UE 16-1.

The macro node 12 determines that the first RSRP associated with the macro node 12 is above a particular RSRP threshold, indicating that the signal strength between the macro node 12 and the UE 16-1 is acceptable. The macro node 12 also determines that the first RSRP associated with all other access nodes, operating in a mode other than the CAOM, is below the particular RSRP threshold (FIG. 3, block 2006). This combination is a relatively strong indicator of the presence of a CAOM LPN, because the other neighboring access nodes which are not operating in CAOM are not exhibiting sufficient signal strength to cause the unacceptable level of interference.

In response to these determinations, the macro node 12 directs the UE 16-1 to report second RSRPs for each neighbor access node operating in the CAOM (FIG. 3, block 2008). For example, in the context of a 3GPP HetNet 10, the macro node 12 can direct the UE 16-1 to report the RSRPs associated with all "blacklisted cells," which is analogous to requesting the RSRPs of all CAOM LPNs (i.e., in the context of a 3GPP LTE system, all CSG LPNs). The macro node 12 receives the second RSRPs associated with each CAOM LPN (FIG. 3, block 2010). In this example, such second RSRP comprises the RSRP associated with the CAOM LPN 14-1. The macro node 12 determines that the second RSRP associated with the CAOM LPN 14-1 is above the particular RSRP threshold (FIG. 3, block 2012). This results in a determination by the macro node 12 that the CAOM LPN 14-1 is the cause of the interference with the UE 16-1 (FIG. 3, block 2014). In one embodiment, the macro node 12 may confirm that the UE 16-1 is not a member of the CAOM LPN 14-1 (FIG. 3, block 2016). Such determination may be made, for example, by communicating with the CAOM LPN 14-1 to request whether the UE 16-1 is a member of the CAOM LPN 14-1, or by requesting from the CAOM LPN 14-1 the "whitelist" that identifies the members of the CAOM LPN 14-1.

The macro node 12 then determines that the UE 16-1 is not IC-capable (FIG. 3, block 2018). For example, the macro node 12 may request this information from the UE 16-1. The macro node 12 may then signal the CAOM LPN 14-1 to provide service to the UE 16-1 (FIG. 3, block 2020). The macro node 12 then directs the UE 16-1 to execute a handover from the macro node 12 to the CAOM LPN 14-1 (FIG. 3, block 2022).

Figure 4:
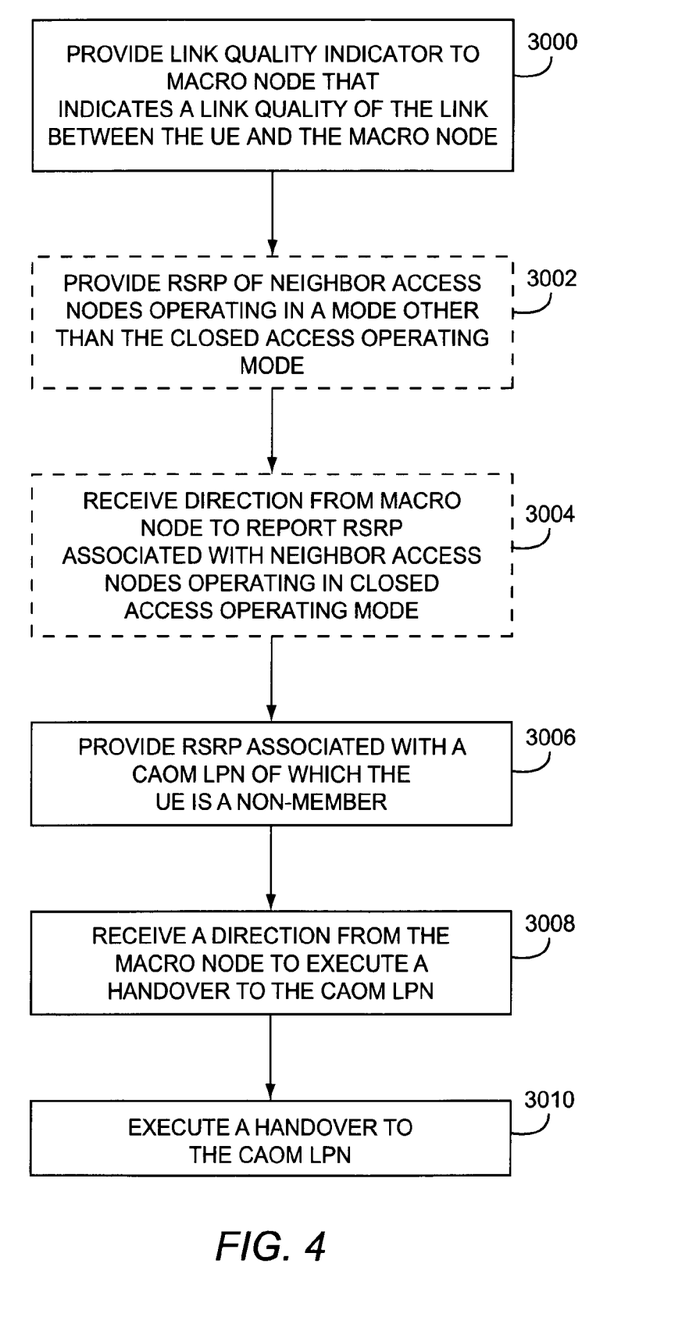
FIG. 4 is a flowchart of an exemplary method performed on a user equipment (UE) for executing a handover to a closed access operating mode (CAOM) low power node (LPN) according to one embodiment.

FIG. 4 is a flowchart of an exemplary method performed on the UE 16-1 for executing a handover to the CAOM LPN 14-1 according to one embodiment. The UE 16-1 provides a link quality indicator to the macro node 12 that indicates a link quality of a link between the UE 16-1 and the macro node 12. For example, in one embodiment, the link quality indicator may comprise the SINR of the link between the UE 16-1 and the macro node 12 (FIG. 4, block 3000). The UE 16-1 also provides signal strength information, such as the RSRP, of each neighbor access node operating in a mode other than the CAOM and for which the UE 16-1 receives a sufficiently strong signal to the macro node 12 (FIG. 4, block 3002).

The UE 16-1 may then receive a direction, such as in the form of a message, from the macro node 12 to report signal strength information, such as the RSRP, associated with each neighbor CAOM LPN (FIG. 4, block 3004). In response, the UE 16-1 provides the RSRP associated with the CAOM LPN 14-1 to the macro node 12 (FIG. 4, block 3006). The UE 16-1 may also receive a request from the macro node 12 to indicate whether the UE 16-1 is IC-capable, or may request from the UE 16-1 an identification of all its capabilities. If so requested, the UE 16-1 provides such information to the macro node 12. The UE 16-1 then receives a direction from the macro node 12 to execute a handover to the CAOM LPN 14-1 (FIG. 4, block 3008). In response, the UE 16-1 executes a handover from the macro node 12 to the CAOM LPN 14-1 (FIG. 4, block 3010).

Figure 5:
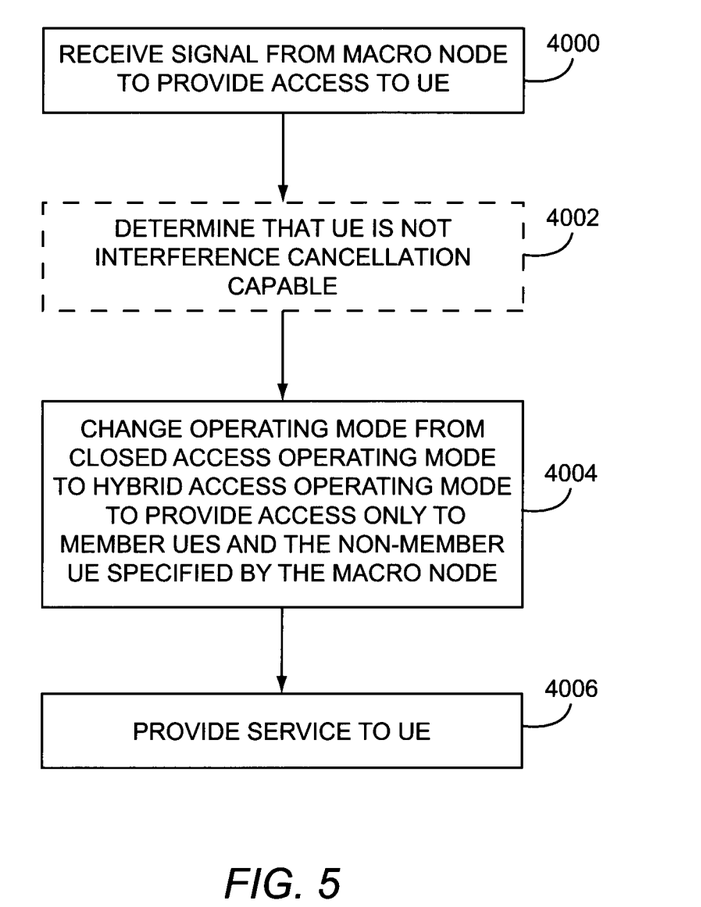
FIG. 5 is a flowchart of an exemplary method performed on a CAOM LPN for providing service to a UE that is not a member of the CAOM LPN.

FIG. 5 is a flowchart of an exemplary method performed on the CAOM LPN 14-1 for providing service to the UE 16-1, which is not a member of the CAOM LPN 14-1. The CAOM LPN 14-1 receives a signal from the macro node 12 to provide access to the UE 16-1 (FIG. 5, block 4000). The signal may take the form of a message, such as a Temporary CSG Access Request message, that requests that the CAOM LPN 14-1 provide temporary access to the UE 16-1. While any suitable message that conveys information sufficient to direct the CAOM LPN 14-1 may suffice, in one embodiment a Temporary CSG Access Request message may take the form illustrated in Table 1.

TABLE 1

Temporary CSG Access Request

| IE/Group Name | Presence | IE type and reference | IE type & reference Options | Semantics description |
|---|---|---|---|---|
| Message Type | M | 9.2.13 | "8" = eNB Configuration Update or "12" = Mobility Settings Change or "X" = CSG WhiteList update Where, X means → new reference item | |
| Old eNB UE X2AP ID | M | eNB UE X2AP ID 9.2.24 | | Allocated at the source eNB |
| Cause | O | 9.2.6 | UE CRS-IC incapable | |
| Target Cell ID | M | ECGI 9.2.14 | | |
| GUMMEI | O | 9.2.16 | | |
| UE Context Information | | | | |
| >MME UE S1AP ID | O | INTEGER $(0 \ldots 2^{32} - 1)$ | | MME UE S1AP ID allocated at the MME |
| >UE Security Capabilities | M | 9.2.29 | | |
| >AS Security Information | M | 9.2.30 | | |
| >UE Aggregate Maximum Bit Rate | O | 9.2.12 | | |
| UE History Information | M | 9.2.38 | | |
| CSG Membership Status | M | 9.2.52 | | |

In another embodiment, the signal may take the form of a Handover Request message that requests that the CAOM LPN 14-1 provide access to the UE 16-1. In one embodiment a Handover Request message may take the form illustrated in Table 2.

TABLE 2

Handover Request

| IE/Group Name | Presence | Range | IE type and reference | Semantics description |
|---|---|---|---|---|
| Message Type | M | | 9.2.13 | |
| Old eNB UE X2AP ID | M | | eNB UE X2AP ID 9.2.24 | Allocated at the source eNB |
| Cause | M | | 9.2.6 | |
| Target Cell ID | M | | ECGI 9.2.14 | |
| GUMMEI | M | | 9.2.16 | |
| UE Context Information | | 1 | | |
| >MME UE S1AP ID | M | | INTEGER (0 ... $2^{32}$ − 1) | MME UE S1AP ID allocated at the MME |
| >UE Security Capabilities | M | | 9.2.29 | |
| >AS Security Information | M | | 9.2.30 | |
| >UE Aggregate Maximum Bit Rate | M | | 9.2.12 | |
| >Subscriber Profile ID for RAT/ Frequency priority | O | | 9.2.25 | |
| Interference Cancellation Capability | M | | Proposed | Includes information about the CRS-IC capability of the UE |
| >E-RABs To Be Setup List | | 1 | | |
| >>E-RABs To Be Setup Item | | 1 ... <maxnoof Bearers> | | |
| >>>E-RAB ID | M | | 9.2.23 | |
| >>>E-RAB Level QoS Parameters | M | | 9.2.9 | Includes necessary QoS parameters |
| >>>DL Forwarding | O | | 9.2.5 | |
| >>>UL GTP Tunnel Endpoint | M | | GTP Tunnel Endpoint 9.2.1 | SGW endpoint of the S1 transport bearer. For delivery of UL PDUs. |
| >RRC Context | M | | OCTET STRING | Includes the RRC Handover Preparation Information message as defined in subclause 10.2.2 of TS 36.331 [9]. |
| >Handover Restriction List | O | | 9.2.3 | |
| >Location Reporting Information | O | | 9.2.21 | Includes the necessary parameters for location reporting |
| >Management Based MDT Allowed | O | | 9.2.59 | |
| UE History Information | M | | 9.2.38 | Same definition as in TS 36.413 [4]. |
| Trace Activation | O | | 9.2.2 | |
| SRVCC Operation Possible | O | | 9.2.33 | |
| CSG Membership Status | O | | 9.2.52 | |

The CAOM LPN 14-1 may then determine whether the UE 16-1 is IC-capable (FIG. 5, block 4002). In one embodiment, this determination may be made in conjunction with the signal received from the macro node 12. In particular, with respect to an embodiment utilizing the form of a Temporary CSG Access Request message as illustrated in Table 1, the Temporary CSG Access Request may indicate whether the UE 16-1 is IC-capable or not. With respect to an embodiment utilizing the form of a Handover Request message as illustrated in Table 2, the Handover Request message may provide the capabilities of the UE 16-1, including whether the UE 16-1 is IC-capable. In other embodiments, the CAOM LPN 14-1 may request such information from the macro node 12. The CAOM LPN 14-1 may then change its operating mode such that the CAOM LPN 14-1 operates in a hybrid access operating mode such that the CAOM LPN 14-1 now serves, or provides access to, member UEs as well as the UE 16-1 (FIG. 5, block 4004). In another embodiment, the CAOM LPN 14-1 does not change its operating mode, but adds the UE 16-1 to its access control list (i.e., the "whitelist" of the CAOM LPN 14-1). The CAOM LPN 14-1 then provides service to the UE 16-1 (FIG. 5, block 4006).

The CAOM LPN 14-1 may only provide service to the UE 16-1 on a temporary basis, based on, for example, an estimated time that the UE 16-1 will stay in proximity to the CAOM LPN 14-1, or until the UE 16-1 leaves the LPN wireless coverage area 20-1 and executes a handover back to the macro node 12, or for a predetermined amount of time. After the CAOM LPN 14-1 terminates access by the UE 16-1, the CAOM LPN 14-1 may remove the UE 16-1 from the access control list of the CAOM LPN 14-1. In one embodiment, after the CAOM LPN 14-1 terminates access to the UE 16-1, such as in response to determining that the UE 16-1 has executed a handover back to the macro node 12, the CAOM LPN 14-1 may the change the operating mode from the hybrid access operating mode back to the closed access operating mode.

Figure 6A:
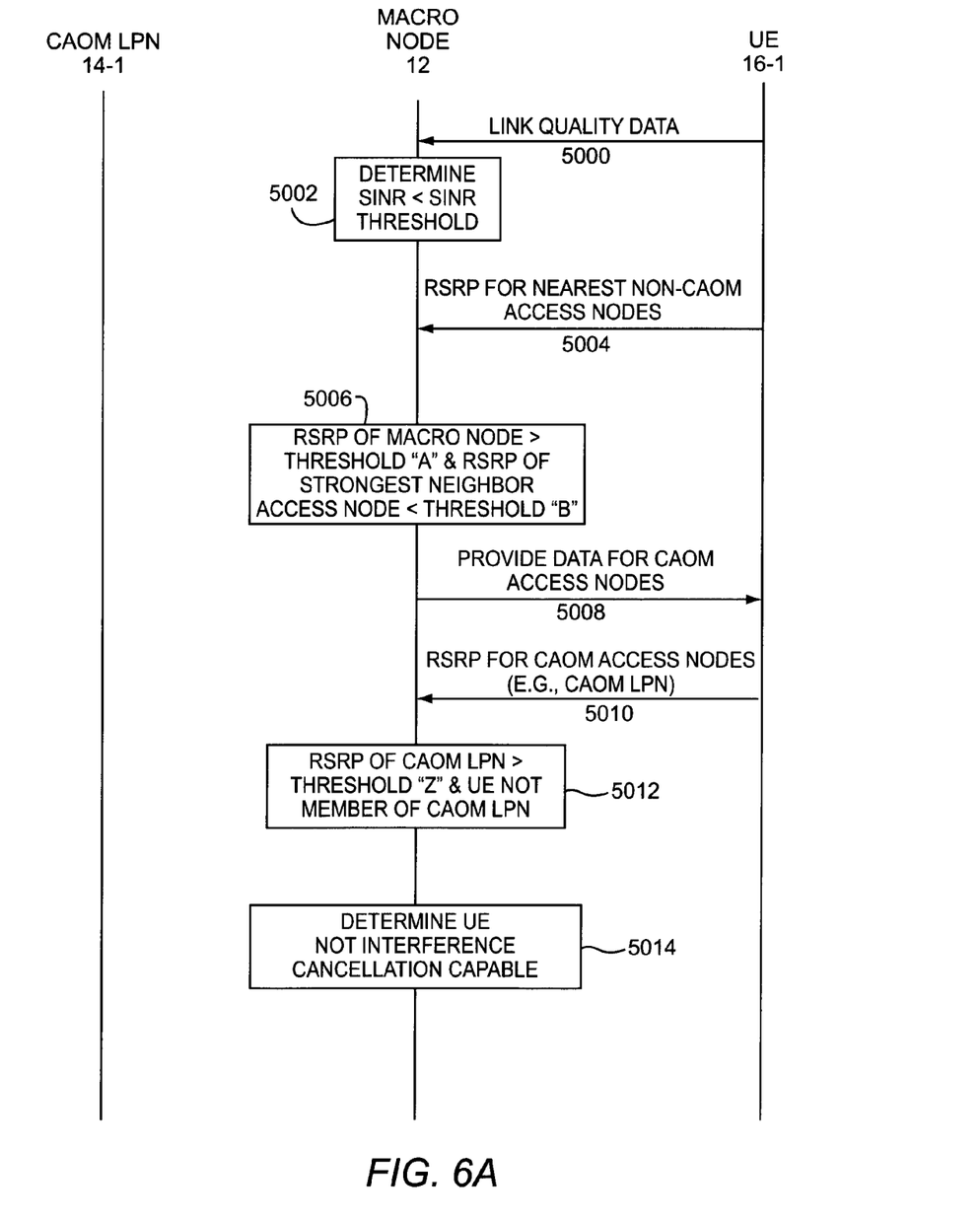
FIGS. 6A-6B are message flow diagrams illustrating an exemplary message flow according to one embodiment.
Figure 6B:
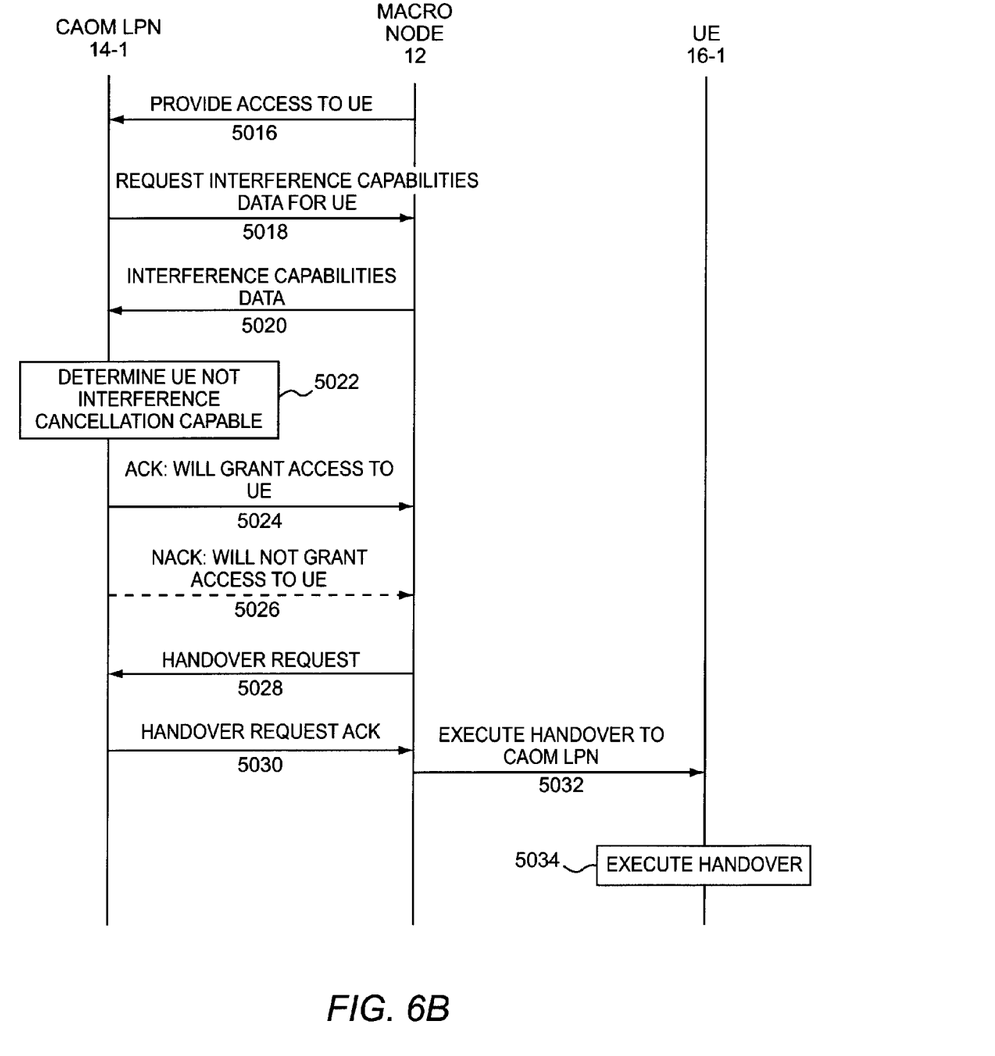

FIGS. 6A-6B are message flow diagrams illustrating an exemplary message flow between the macro node 12, the CAOM LPN 14-1 and the UE 16-1, according to one embodiment. Assume that the macro node 12 is currently serving the UE 16-1, and that the UE 16-1 is not a member of the CAOM LPN 14-1. The macro node 12 receives link quality data from the UE 16-1 that identifies a link quality of the link between the macro node 12 and the UE 16-1 (step 5000). The link quality data may comprise, for example, a SINR of such link. The macro node 12 determines that the SINR is greater than a SINR threshold (step 5002). The macro node 12 also receives from the UE 16-1 the RSRP associated with neighboring access nodes that are not operating in CAOM for which the UE 16-1 receives a sufficiently strong signal, including the RSRP associated with the macro node 12 (step 5004).

The macro node 12 determines that RSRP associated with the macro node 12 is greater than a threshold A and that the strongest RSRP of the other access nodes received from the UE 16-1 is less than a threshold B (step 5006). This is an indicator to the macro node 12 that the source of the interference may be a CAOM LPN such as the CAOM LPN 14-1. The macro node 12 then directs the UE 16-1 to provide signal strength information, such as RSRP information, for CAOM LPNs (step 5008). In response, the UE 16-1 provides RSRPs associated with each CAOM LPN from which the UE 16-1 receives a sufficiently strong signal, including, in this example, an RSRP associated with the CAOM LPN 14-1 (step 5010).

The macro node 12 determines that the RSRP associated with the CAOM LPN 14-1 is greater than a threshold Z and that the UE 16-1 is not a member of the CAOM LPN 14-1 (step 5012). Membership can be determined, for example, by requesting such information from the CAOM LPN 14-1. The macro node 12 may then determine that the UE 16-1 is not IC-capable (step 5014). The macro node 12 then signals the CAOM LPN 14-1 to provide access to the UE 16-1 (step 5016). Such signal can take the form of one or more messages, including, for example, those described above with respect to Tables 1 and 2. Assume for purposes of illustration, however, that the signal does not include the IC-capability of the UE 16-1. In this event, the CAOM LPN 14-1 may request the interference capabilities data for the UE 16-1 from the macro node 12 (step 5018). In response, the macro node 12 provides the interference capabilities information of the UE 16-1 to the CAOM LPN 14-1 (step 5020). Based on this information, assume that the CAOM LPN 14-1 determines that the UE 16-1 is not IC-capable (step 5022). The CAOM LPN 14-1 may then send an acknowledgement (i.e., an "ACK") to the macro node 12 confirming that the CAOM LPN 14-1 will provide access to the UE 16-1 (step 5024). While such acknowledgment may take any suitable form, in one embodiment, the acknowledgment may take the form of a CSG Access Acknowledgement (ACK) message, as illustrated in Table 3.

TABLE 3

CSG Access Acknowledgement (ACK)

| IE/Group Name | Presence | IE type and reference | IE type & reference Options | Semantics description |
|---|---|---|---|---|
| Message Type | M | 9.2.13 | "X" = Temporary Access ACK Where, X means → new reference item | |
| Old eNB UE X2AP ID | M | eNB UE X2AP ID 9.2.24 | | Allocated at the source eNB |

If, on the other hand, the CAOM LPN 14-1 determined that the UE 16-1 is IC-capable, the CAOM may send a negative acknowledgment (i.e., a "NACK") to the macro node 12 to indicate to the macro node 12 that the CAOM LPN 14-1 will not provide access to the UE 16-1 (step 5026). While such negative acknowledgment may take any suitable form, in one embodiment, the negative acknowledgment may take the form of a CSG Access Negative-Acknowledgement (NACK) message, as illustrated in Table 4.

TABLE 4

CSG Access Negative-Acknowledgement (NACK)

| IE/Group Name | Presence | IE type and reference | IE type & reference Options | Semantics description |
|---|---|---|---|---|
| Message Type | M | 9.2.13 | "Y" = Temporary Access NACK Where, Y means → new reference item | |
| Old eNB UE X2AP ID | M | eNB UE X2AP ID 9.2.24 | | Allocated at the source eNB |
| Cause | M | 9.2.6 | No Radio Resources Available in Target Cell Unknown New eNB UE X2AP ID, Unknown Old eNB UE X2AP ID, Unknown Pair of UE X2AP ID, Invalid MME Group ID, Encryption And/Or Integrity Protection | |

In response to receiving an ACK from the CAOM LPN 14-1, the macro node 12 sends a handover request message to the CAOM LPN 14-1 (step 5028). The CAOM LPN 14-1 may then send an ACK to the macro node 12 (step 5030). In response, the macro node 12 directs the UE 16-1 to execute a handover to the CAOM LPN 14-1 (step 5032). The UE 16-1 then executes a handover from the macro node 12 to the CAOM LPN 14-1 (step 5034).

Figure 7:
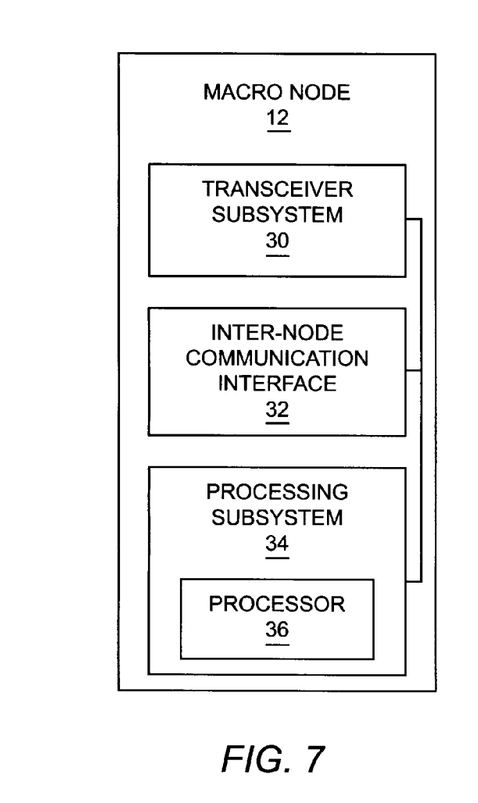
FIG. 7 is a block diagram of an exemplary macro node according to one embodiment.

FIG. 7 is a block diagram of a macro node 12 according to one embodiment of the present disclosure. The macro node 12 includes a transceiver subsystem 30, an inter-node communication interface 32, and a processing subsystem 34. The transceiver subsystem 30 generally includes analog and, in some embodiments, digital components for sending and receiving communications to and from UEs 16 within the macro wireless coverage area 18 of the macro node 12. The inter-node communication interface 32 generally includes analog and, in some embodiments, digital components for sending and receiving communications to and from other nodes, such as the LPNs 14 and/or other macro nodes. From a communications protocol view, the transceiver subsystem 30 and the inter-node communication interface 32 implement at least part of Layer 1 (i.e., the Physical or "PHY" Layer). The processing subsystem 34 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 30, the inter-node communication interface 32, and the processing subsystem 34, will vary depending on both the particular implementation as well as the standard or standards supported by the macro node 12.

Those skilled in the art will appreciate that the block diagram of the macro node 12 necessarily omits numerous features that are not necessary to a complete understanding of this disclosure. Although all of the details of the processing subsystem 34 are not illustrated, the processing subsystem 34 comprises one or several general-purpose or special-purpose microprocessors 36 or other microcontrollers programmed with suitable software programming instructions and/or firmware to carry out some or all of the functionality of the macro node 12 described herein. In addition or alternatively, the processing subsystem 34 may comprise various digital hardware blocks (e.g., one or more Application Specific Integrated Circuits (ASICs), one or more off-the-shelf digital and analog hardware components, or a combination thereof) configured to carry out some or all of the functionality of the macro node 12 described herein. The macro node 12 may also include one or more storage medium for storing data necessary and/or suitable for implementing the functionality described herein, as well as for storing programming instructions which, when executed on the processor 36, may implement all or part of the functionality described herein.

Figure 8:
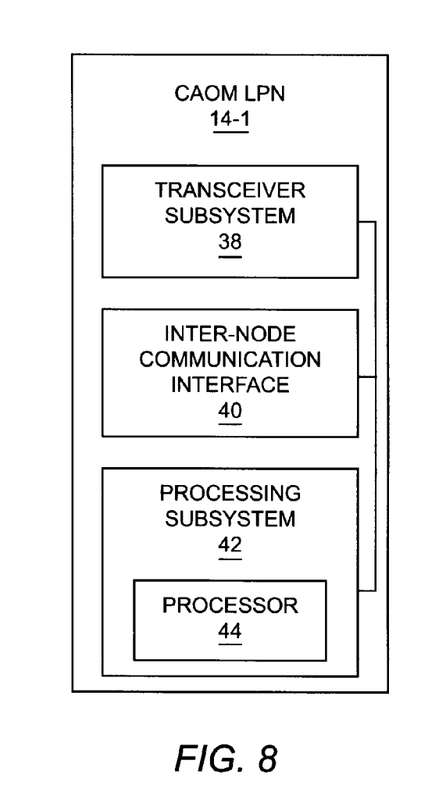
FIG. 8 is a block diagram of an exemplary CAOM LPN according to one embodiment.

FIG. 8 is a block diagram of the CAOM LPN 14-1 according to one embodiment of the present disclosure. The CAOM LPN 14-1 includes a transceiver subsystem 38, an inter-node communication interface 40, and a processing subsystem 42. The transceiver subsystem 38 generally includes analog and, in some embodiments, digital components for sending and receiving communications to and from UEs 16 within the LPN wireless coverage area 20-1 of the CAOM LPN 14-1. The inter-node communication interface 40 generally includes analog and, in some embodiments, digital components for sending and receiving communications to and from other nodes, such as the macro node 12 or the LPNs 14-2-14-N. From a communications protocol view, the transceiver subsystem 38 and the inter-node communication interface 40 implement at least part of Layer 1 (i.e., the Physical or "PHY" Layer). The processing subsystem 42 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 38, the inter-node communication interface 40, and the processing subsystem 42, will vary depending on both the particular implementation as well as the standard or standards supported by the CAOM LPN 14-1.

Those skilled in the art will appreciate that the block diagram of the CAOM LPN 14-1 necessarily omits numerous features that are not necessary to a complete understanding of this disclosure. Although all of the details of the processing subsystem 42 are not illustrated, the processing subsystem 42 comprises one or several general-purpose or special-purpose microprocessors 44 or other microcontrollers programmed with suitable software programming instructions and/or firmware to carry out some or all of the functionality of the CAOM LPN 14-1 described herein. In addition or alternatively, the processing subsystem 42 may comprise various digital hardware blocks (e.g., one or more Application Specific Integrated Circuits (ASICs), one or more off-the-shelf digital and analog hardware components, or a combination thereof) configured to carry out some or all of the functionality of the CAOM LPN 14-1 described herein. The CAOM LPN 14-1 may also include one or more storage medium for storing data necessary and/or suitable for implementing the functionality described herein, as well as for storing programming instructions which, when executed on the processor 44, may implement all or part of the functionality described herein.

Figure 9:
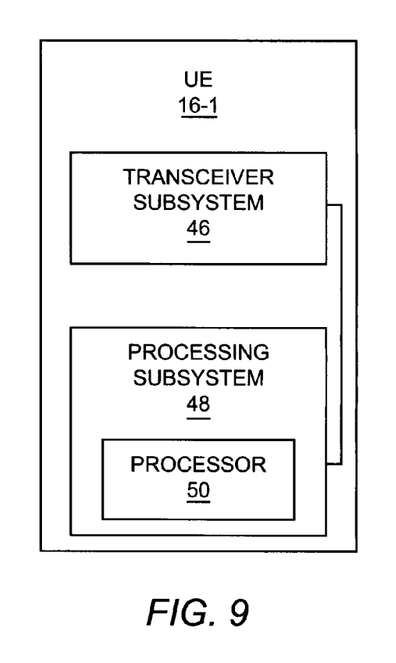
FIG. 9 is a block diagram of an exemplary UE according to one embodiment.

FIG. 9 is a block diagram of a UE 16 according to one embodiment of the present disclosure. The UE 16 may comprise, for example, a cellular telephone such as an Apple® iPhone® smartphone, an Android®-based smartphone, or the like; a computing tablet with cellular capabilities such as an Apple iPad® or the like; a laptop computer with cellular capabilities; or any other processing device capable of communicating wirelessly with the macro node 12. The UE 16 includes a transceiver subsystem 46 and a processing subsystem 48. The transceiver subsystem 46 generally includes analog and, in some embodiments, digital components for sending and receiving communications to and from base stations, such as the macro node 12 and the LPNs 14. From a communications protocol view, the transceiver subsystem 46 implements at least part of Layer 1 (i.e., the Physical or "PHY" Layer). The processing subsystem 48 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 46 and the processing subsystem 48, will vary depending on both the particular implementation as well as the standard or standards supported by the UE 16.

Those skilled in the art will appreciate that the block diagram of the UE 16 necessarily omits numerous features that are not necessary to a complete understanding of this disclosure. Although all of the details of the processing subsystem 48 are not illustrated, the processing subsystem 48 comprises one or several general-purpose or special-purpose microprocessors 50 or other microcontrollers programmed with suitable software programming instructions and/or firmware to carry out some or all of the functionality of the UE 16 described herein. In addition or alternatively, the processing subsystem 48 may comprise various digital hardware blocks (e.g., one or more Application Specific Integrated Circuits (ASICs), one or more off-the-shelf digital and analog hardware components, or a combination thereof) configured to carry out some or all of the functionality of the UE 16 described herein. The UE 16 may also include one or more storage medium for storing data necessary and/or suitable for implementing the functionality described herein, as well as for storing programming instructions which, when executed on the processor 50, may implement all or part of the functionality described herein.

The following acronyms are used throughout this disclosure:
3GPP 3rd Generation Partnership Project
ACK Acknowledgement
ASICs Application Specific Integrated Circuits
CAOM Closed Access Operating Mode
CRS Cell-specific Reference Signals
CSG Closed Subscriber Group
DL Downlink
HAOM Hybrid Access Operating Mode
HeNBs Home eNodeBs
HetNet Heterogeneous Network
IC interference cancellation
LPN Low Power Node
LTE Long Term Evolution
NACK Negative Acknowledgment
OAOM Open Access Operating Mode
RSRP Reference Symbol Received Power
SINR Signal to Interference-plus-Noise Ratio
UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A method for triggering a handover of a user equipment, UE, being serviced by a macro node to a low power node, LPN, operating in a closed access operating mode wherein the LPN provides service to member UEs, the UE being a non-member of the LPN, the method comprising: determining, by the macro node, a trigger condition; based on the trigger condition, signaling, by the macro node, the LPN to provide service to the UE, the signaling including an identifier that identifies the UE; and directing, by the macro node, the UE to execute the handover to the LPN.

2. The method of claim 1, wherein determining the trigger condition comprises: determining that an unacceptable level of interference is caused by the LPN; and determining that the UE is not interference cancellation capable.

3. The method of claim 1, wherein determining the trigger condition comprises determining that a link quality indicator that indicates a link quality of a link between the macro node and the UE indicates an unacceptable level of interference.

4. The method of claim 3, wherein the link quality indicator comprises a signal-to-interference-and-noise ratio, SINR, of the link between the macro node and the UE and wherein the unacceptable level of interference comprises the SINR being less than a threshold SINR.

5. The method of claim 3, further comprising: determining that the UE is within a wireless coverage area of the LPN.

6. The method of claim 5, wherein determining that the UE is within the wireless coverage area of the LPN comprises: directing, by the macro node, the UE to report a reference symbol received power, RSRP, from each LPN operating in the closed access operating mode from which the UE receives a reference symbol; receiving, from the UE the RSRP received by the UE from the LPN; and determining that the UE is within the wireless coverage area of the LPN based on the RSRP.

7. The method of claim 6, wherein determining the trigger condition further comprises determining that the UE is not a member of the LPN.

8. The method of claim 7, wherein determining that the UE is not a member of the LPN comprises requesting, from the LPN, information identifying whether the UE is a member of the LPN.

9. The method of claim 6, wherein determining the trigger condition further comprises determining that the UE is not interference cancellation capable.

10. The method of claim 3, further comprising: determining that the unacceptable level of interference is caused by the LPN.

11. The method of claim 10, wherein determining that the unacceptable level of interference is caused by the LPN comprises: receiving, from the UE, a first reference symbol received power, RSRP, associated with each neighbor access node operating in a mode other than the closed access operating mode from which the UE receives a reference symbol; determining that the first RSRP associated with the each neighbor access node is below a threshold; based on determining that the first RSRP associated with the each neighbor access node is below the threshold, directing, by the macro node, the UE to report a second RSRP associated with each access node operating in the closed access operating mode from which the UE receives a reference symbol; receiving, from the UE, the second RSRP associated with the LPN; and determining that the second RSRP is above the threshold.

12. The method of claim 1, wherein signaling the LPN to provide service to the UE comprises signaling the LPN to provide service to the UE for a temporary duration of time.

13. The method of claim 1, wherein signaling the LPN to provide service to the UE further comprises indicating that the UE is not interference cancellation capable.

14. The method of claim 1, wherein the LPN comprises a closed subscriber group LPN.

15. The method of claim 1, wherein a wireless coverage area of the LPN is subsumed within a wireless coverage area of the macro node.

16. A system comprising: a macro node communicatively coupled to a low power node (LPN) operating in a closed access operating mode wherein the LPN provides service to member user equipment, UEs, which are identified as member of the LPN; the macro node configured to: establish a link with a UE which is not identified as a member of the LPN; determine a trigger condition; based on the trigger condition, communicate a request to the LPN to provide service to the UE, the request including an identifier that identifies the UE; and direct the UE to execute a handover to the LPN.

17. The system of claim 16, wherein the LPN is configured to: receive the request; in response to the request, change an operating mode of the LPN from the closed access operating mode to a hybrid access operating mode wherein the LPN provides access only to the member UEs and the UE; and provide service to the UE.

18. The system of claim 17, wherein the LPN is further configured to: determine that the UE has executed a handover back to the macro node; and in response to determining that the UE has executed the handover back to the macro node change the operating mode of the LPN from the hybrid access operating mode to the closed access operating mode.

19. A macro node comprising: a transceiver subsystem configured to communicate with a user equipment, UE, and a low power node, LPN, the LPN operating in a closed access operating mode wherein the LPN provides service to member UEs, the UE being a non-member of the LPN; and a processing subsystem controller coupled to the wireless interface and configured to: determine a trigger condition; based on the trigger condition, signal the LPN to provide service to the UE, the signal including an identifier that identifies the UE; and direct the UE to execute a handover to the LPN.

20. The macro node of claim 19, wherein to determine the trigger condition, the processing subsystem is further configured to: determine that a link quality indicator that indicates a link quality of a link between the macro node and the UE indicates an unacceptable level of interference; and determine that the UE is within a wireless coverage area of the LPN.

21. A low power node, LPN, comprising: a transceiver subsystem configured to communicate with a user equipment, UE, the LPN configured to operate in a closed access operating mode wherein the LPN provides service to one or more member UEs; an inter-node communication interface configured to communicate with a macro node; and a processing subsystem coupled to the transceiver subsystem and the inter-node communication interface, the processing subsystem configured to: receive a signal from the macro node to provide access to a UE that is not a member of the LPN, the signal including an identifier that identifies the UE; in response to the signal, change an operating mode from the closed access operating mode to a hybrid access operating mode wherein the LPN provides access only to the member UEs and the UE; and provide service to the UE.

22. A method implemented in a low power node, LPN, the LPN configured to operate in a closed access operating mode wherein the LPN provides service to member user equipment, UEs, comprising: receiving a signal from a macro node to provide access to a UE that is not a member of the LPN, the signal including an identifier that identifies the UE; in response to the signal, change an operating mode from the closed access operating mode to a hybrid access operating mode wherein the LPN provides access to the member UEs and the UE; and provide service to the UE.

\* \* \* \* \*